United States Patent Office 3,322,669
Patented May 30, 1967

3,322,669
SULFUR SUBSTITUENTS OF PROPENE/BUTENE
COPOLYMERS AS V.I. IMPROVERS
Louis de Vries, Richmond, Calif., assignor to Chevron
Research Company, a corporation of Delaware
No Drawing. Filed Feb. 3, 1965, Ser. No. 430,185
11 Claims. (Cl. 252—47)

This invention relates to novel lubricant compositions containing novel high molecular weight polymeric viscosity index improvers. More particularly, this invention relates to novel superior lubricant compositions containing novel sulfur-containing high molecular weight polymeric viscosity index improvers.

Lubricant compositions in many present-day applications contain viscosity index improvers in order to be effective over a wide temperature range. Viscosity index is an empirical scale developed by the petroleum industry to give a simple numerical expression to the relation of an oil's viscosity to its temperature. With the broad temperature ranges required by modern-day engines, it is necessary that the lubricant be sufficiently fluid at low temperatures in order that it circulate freely and provide a lubricating film between wearing surfaces such as bearings, piston rings, and cylinder walls. Alternatively, at high temperatures, such as the operating temperatures of internal combustion engines, the lubricant composition must be thick enough to provide a protective lubricating film.

It has now been found that high molecular weight "Ziegler-type" copolymers of 1-olefins of $C_2$–$C_4$ having sulfur substituents as sulfide linkages to organic radicals and having molecular weights in the range of about $1$–$20 \times 10^5$ molecular weight greatly improve the viscosity index of lubricating compositions.

The polymeric backbone of the compositions of this invention is, as already indicated, a $C_2$–$C_4$ 1-olefin copolymer prepared using "Ziegler" or similar catalysts having from 15 to 85 mole percent of any one olefin (not less than 15% of a particular olefin), more usually 25 to 60 mole percent of a particular olefin. The polymer is preferably a random copolymer, but may be alternating block or a terminal block copolymer.

The copolymers of this invention are illustrated by ethylene/propylene, ethylene/butene and propylene/butene.

As indicated, the polymer is prepared using "Ziegler-type" catalysts. These catalysts are well known in the art and usually involve a metal of Groups 1 to 3 of the Periodic Chart as an organo-metallic compound, with a metal of Groups 4 to 6 of the Periodic Chart in a reducible state. The most popular catalysts are those comprising organo-aluminum compounds, such as trialkyl aluminum or mono- and dialkyl aluminum halides, with a titanium or vanadium halide, e.g. titanium trichloride and vanadium oxychloride. The procedures for carrying out these polymerizations are well known in the art and do not require exemplification here.

In carrying out the "Ziegler" polymerizations, rarely will the product be 100 percent stereoregular. Usually, some of the polymer will be amorphous, as indicated by its solubility characteristics, e.g. solubility in heptane, and the stereoregular polymers may have sections or segments where the monomers are not aligned in a stereoregular manner.

The polymers used in this invention may vary from 0 to 100 percent of stereoregular polymers. That is, the polymer may be isotactic, syndiotactic, or atactic. Usually, the polymer backbone will be mixtures of both isotactic and atactic. The amount of atactic will usually be less than 60%, and more usually less than 40%. For the purposes of this invention, there is no need to separate the atactic from the isotactic polymer, and therefore in most instances the polymeric composition will be a mixture of the two types of polymers.

The molecular weight of the polymer will be at least about 100,000 and generally higher, usually not exceeding 1,500,000. More usually, the molecular weight will be in the range of about 200,000 to 1,250,000.

The sulfur is introduced into the polymer by first chlorinating the polymer and then displacing the chlorine with the desired thio compound in the presence of a polar solvent. The amount of sulfur introduced will generally be from about 2 to 25 weight percent of the polymeric composition, more usually from about 5 to 18 weight percent of the polymeric composition.

The sulfur will generally be substituted on the various carbons present in the polymer. That includes methylene and methine which are present along the polymer chain, as well as the methylene and methyl groups which are pendant from the chain.

The sulfur radicals have the following formula

US— wherein S is the usual designation for sulfur and U is either a hydrocarbyl radical or an acyl radical. (By hydrocarbyl is intended a monovalent organic radical composed solely of carbon and hydrogen and being either aliphatic, alicyclic, aromatic or combinations thereof, e.g. aralkyl.) U will generally be of from 1 to 20 carbon atoms, more usually of from 1 to 12 carbon atoms. U may also include when it is an acyl radical from 1 to 2 heteroatoms, such as sulfur, oxygen and nitrogen.

When U is hydrocarbyl, the radical pendant from the polymer will have the following formula

RS— wherein R is hydrocarbyl of from 1 to 20 carbon atoms, more usually of from 1 to 12 carbon atoms. Illustrative of various radicals included in the above formula are methyl, ethyl, propyl, isopropyl, hexyl, pentyl, decyl, dodecyl, octadecyl, cyclohexyl, cyclopentyl, benzyl, phenyl, tolyl, cumyl, octylphenyl, etc.

The hydrocarbyl groups may have a variety of substituents. The substituted hydrocarbyl groups include such substituents as amino, cyano, carboalkoxy, halo, etc. Of particular interest is the amino-substituted hydrocarbyl groups having from 1 to 2 amino groups, more usually one amino group. Illustrative of these radicals are aminophenyl, aminobenzyl, 6-aminohexyl, toluidinyl, etc. Preferred amino hydrocarbyls are the aromatic amino hydrocarbyls having the amine group substituted on a C annular carbon.

When U is an acyl group, the radicals pendant on the polymer backbone have the following formula

$$T\overset{X}{\underset{\parallel}{C}}S-$$

wherein X is chalcogen of atomic number 8 to 16, i.e. oxygen and sulfur, and T is either hydrocarbyl of from 1 to 19 carbon atoms, amino (including hydrocarbylamino and dihydrocarbylamino) and hydrocarbyloxy. (Hydrocarbyloxy is an organic radical composed solely of carbon, hydrogen and oxygen, wherein the hydrocarbyl group as defined above is bonded to an ethereal oxygen atom.) Usually, T will be of from 0 to 19 carbon atoms, more usually of from 1 to 19 carbon atoms, preferably of from 1 to 11 carbon atoms.

All the chlorine need not be substituted and amounts from 0 to 15 weight percent chlorine may be present in the final polymer. The chlorine does not interfere with the use of the sulfur substituted polymer as a lubricating oil additive and may be considered as an inert substituent.

As already indicated, in preparing the compositions of this invention, the preformed polymer is chlorinated. The chlorination is carried out by dissolving the copolymer in an inert solvent, e.g. carbon tetrachloride, usually to the extent of about 20 to 40 weight percent, and then passing chlorine through the solution using ultraviolet catalysis. Generally, the temperature will be in the range of about 20° to 75° C., more usually in the range of about 20° to 50° C. When the desired amount of chlorine has been introduced, optionally, the polymer is precipitated twice in benzene solutions and then dried.

The chlorinated polymer is then dissolved in a suitable polar solvent. The preferred solvents are the ethylene glycol ethers and the polyethylene glycol ethers. That is, diethylene glycol dimethyl ether, diethylene glycol diethyl ether, dimethyl ether of ethylene glycol, etc. The solvent will generally have from 2 to 4 ethereal oxygen atoms and be of from 4 to 12 carbon atoms, more usually of from 6 to 10 carbon atoms. Other solvents include N-methyl pyrrolidone, hexamethylphosphoramide, etc. The solvents may be used individually or in combination.

The concentration of the polymer in the solution is not critical and will generally be based on the solubility of the polymer in the solvent. Usually, from about 0.1 to 20 weight percent will be the concentration of the solution.

The thio compound will be used as its alkali metal salt, particularly of atomic number 3 to 19, most usually as its sodium salt. Generally, to insure complete reaction, a large excess of the thio compound will be used. Therefore, based on the chlorine present in the polymer, the amount of the thio compound will range from 1 to 5 moles per atom of chlorine present.

The temperature for the reaction will generally range from about 50° to 150° C., more usually from 75° to 150° C.

The time for the reaction will generally be at least one-half hour and will generally not exceed 24 hours. More usually, the time for the reaction will be in the range of about 1 to 12 hours, depending on the temperature, the concentration, and the particular reactants used.

The compositions of this invention find particular use as viscosity index improvers. As viscosity index improvers, they may be used with various base oils which find use as lubricating oils, such as naphthenic base, paraffin base and mixed base petroleum lubricating oils; other hydrocarbon lubricants, e.g. alkylene polymers (such as polymers of propylene, butylene, etc. and the mixtures thereof), alkylene oxide type polymers (e.g. propylene oxide polymers) and derivatives, including alkylene oxide polymers prepared by polymerizing the alkylene oxide in the presence of alcohol, e.g. ethyl alcohol; dicarboxylic esters; liquid esters of inorganic acids, e.g. phosphorus acids; silicon compounds, etc.

The above base oils may be used individually or in combination whenever miscible or made so by the use of mutual solvents.

The following examples are offered by way of illustration and not by way of limitation.

Example 1

(A) Into a reaction flask was introduced a solution of 10 g. of propene/butene copolymer (mol. wt.=approximately $3 \times 10^5$, mol. percent propene=40) chlorinated to an extent of 20.7 weight percent chlorine in 80 ml. dry diethylene glycol dimethyl ether. The mixture was heated to 100° C. and approximately 24.5 g. of the sodium salt of benzene thiol in 80 cc. of N-methyl pyrrolidone added. The temperature was then raised to 145° C. and maintained for about 18 hours. The mixture was allowed to cool and then precipitated with methanol, redissolved and reprecipitated for a total of three times.

(B) The above procedure was repeated except that a polymer containing 16 weight percent chlorine was used.

Example 2

Into a reaction flask was introduced 7 g. of a chlorinated propene/butene copolymer (mol. wt.=approximately $2 \times 10^5$, mol. percent propene=40, 13.7 weight percent chlorine), 14.4 g. of diethyl dithiocarbamic acid as its sodium salt and 200 ml. of dry diethylene glycol dimethyl ether and the mixture heated at 140° for 5 hours. The polymer was precipitated with methanol and redissolved and reprecipitated for a total of three times. Analysis: Chlorine, 7.2%; nitrogen, 1.5%; sulfur, 5.78%.

Example 3

Into a reaction flask was introduced 6.7 g. of a chlorinated ethylene/propylene copolymer ($C_3$ mol. percent= 40, mol. wt.=$2 \times 10^5$, 11 weight percent chlorine), 11 g. of diethyl dithiocarbamic acid as its sodium salt and 150 ml. of diethylene glycol dimethyl ether, and the mixture heated at 140° C. for 16 hours. At the end of this time, the mixture was allowed to cool and the polymer precipitated with methanol and redissolved for a total of three times.

Example 4

Into a reaction flask was introduced a chlorinated propene/butene copolymer (mol. wt.=$2 \times 10^5$, mol. percent propene=40, 13.9 weight percent chlorine) in 150 ml. of dry diethyl ether of diethylene glycol to which was added an N-methyl pyrrolidone solution of the reaction product of 4.68 g. mercaptoethanol and 2.9 g. sodium hydride and the mixture heated at 160° C. for 16 hours. The mixture was then allowed to cool and the polymer precipitated with methanol, redissolved and reprecipitated for a total of three times.

The above product was then mixed with 21 g. of acetic anhydride and 21 g. of triethyl amine and the mixture heated to reflux for 4 hours. At the end of this time, the mixture was cooled and the polymer twice precipitated with methanol and redissolved. Analysis: 4.4% chlorine.

Example 5

Into a reaction flask was introduced 10 g. of a chlorinated ethylene/propene copolymer (mol. wt.=$2 \times 10^5$, mol percent propene=40, 13.2% chlorine) in 150 cc., 150 ml. dry diethylene glycol diethyl ether, and the sodium mercaptide salt of mercaptoethanol prepared from 8.7 g. mercaptoethanol and 5.4 g. of 50% sodium hydride, and 75 cc. of N-methyl pyrrolidinone added and the mixture heated with stirring at 160° C. for 16 hours. At the end of this time, the polymer was precipitated with methanol and dissolved in benzene, the procedure being repeated three times. The polymer was then dissolved in xylene, 27 g. acetic anhydride and 27 g. triethyl amine added, and the mixture heated at 120° C. for 4 hours. The final product was then precipitated three times with methanol from benzene solution to provide the acetoxyethyl mercaptide derivative.

Example A

Into a reaction vessel fitted with an agitator, condenser and dispersion tube was introduced 1200 ml. of isooctane and propylene, butene-1 and hydrogen at flow rates of 600, 400 and 100 cc./minute, respectively. The mixture was heated to 60° C. and the preformed catalyst from 3.4 g. of titanium trichloride AA and 4.8 cc. of triisobutyl aluminum added. The temperature was then raised within 5 minutes to 95° C. After a period of 1.5 hours, the temperature started falling. Further catalyst was added (1.8 g. titanium trichloride AA and 2.5 cc. triisobutyl aluminum), the temperature dropping to 75° C. and being raised to 89° C. slowly. The total time for the reaction was 3 hours. The reaction mixture was cooled, the solids allowed to settle, and then 2 volumes of hexane added and the polymer isolated.

Example B

Using 89.6 g. of a copolymer prepared as described above, the polymer was dissolved in 350 cc. of carbon tetrachloride, nitrogen bubbled through the solution for 15 minutes, and then chlorine bubbled into the solution for 7 minutes. After which, the solution was irradiated with an ultraviolet lamp in 93 minutes, while the chlorine was continuously bubbled into the solution. At the end of this time, the chlorine addition and irradiation was stopped and the polymer precipitated with methanol, then dissolved in benzene, filtered through Celite, the benzene removed and the polymer isolated. Analysis showed 28.2 weight percent chlorine.

In order to demonstrate the effectiveness of the compounds of this invention as viscosity index improvers, the viscosity index of oil solutions containing the various polymers was determined. The compositions were dissolved in SAE 130 Neutral Oil at a concentration of 2.8 weight percent. For a number of polymers the shear was determined according to ASTM, vol. 1, p. 1160 (1961). The following table indicates the results obtained.

TABLE

| Ex. | $V_{100}$ SSU | $V_{210}$ SSU | V.I. | Shear [1] C | Wt. Percent Polymer in Shear Test |
|---|---|---|---|---|---|
| 1-B | 306.0 | 61.7 | 138 | | |
| 2 | 216.9 | 52.2 | 136.5 | | |
| 3 | 556.5 | 87.95 | 137 | 27.5–22.0–15.8 | 1.5 |
| 4 | 296.9 | 60.8 | 138 | | |
| 5 | 453.3 | 77.6 | 137.5 | 30.4–22.67–18.6 | 2.0 |
| 6 | 382.4 | 69.9 | 138 | | |

[1] Acryloid 763, Sample, Acryloid 710. The Acryloid polymers are available as standards from Rohm & Haas Company.

The above data demonstrate that the compositions of this invention show good viscosity index improvement while at the same time having excellent shear stability.

The compositions of this invention are compatible with a variety of other additives, such as rust inhibitors, detergents, etc. and may also be used with advantage with other viscosity index improvers.

As will be evident to those skilled in the art, various modifications on this process can be made or followed, in the light of the foregoing disclosure and discussion, without departing from the spirit or scope of the disclosure or from the scope of the following claims.

I claim:

1. Copolymers consisting essentially of two olefins of the group consisting of ethylene, propylene and 1-butene, wherein one of the olefins is present in from 15 to 85 mole percent, wherein said copolymers are of a molecular weight in the range of 1 to 20×10⁵ and are prepared by using a Ziegler catalyst comprising in combination an organo-aluminum compound and a titanium or vanadium halide, and wherein sulfur, as sulfide linkages from the copolymer to organic radicals, is present in an amount of from 2 to 25 weight percent, the organic radicals being selected from the group consisting of hydrocarbyl of from 1 to 20 carbon atoms, carboalkoxy substituted hydrocarbyl of from 1 to 20 carbon atoms, hydroxy substituted hydrocarbyl of from 1 to 12 carbon atoms, aminohydrocarbyl radicals of from 1 to 20 carbon atoms and having from 1 to 2 amino groups and acyl radicals of the formula:

wherein X is chalcogen of atomic number 8 to 16, and T is amino or of from 1 to 19 carbon atoms and hydrocarbyl, hydrocarbylamino or dihydrocarbylamino.

2. A copolymer according to claim 1, wherein said organic radical is alkyl or aryl hydrocarbyl of from 1 to 12 carbon atoms.

3. A copolymer according to claim 1, wherein said organic radical is of the formula:

wherein X is sulfur and T is dihydrocarbylamino of from 1 to 11 carbon atoms.

4. A copolymer according to claim 1, wherein said organic radical is diethylthiocarbamyl.

5. A copolymer according to claim 1, wherein said organic radical is phenyl.

6. A copolymer according to claim 1, wherein said two olefins are propene and butene-1 and wherein said organic radical is hydrocarbyl of from 1 to 20 carbon atoms.

7. A copolymer according to claim 1, wherein said two olefins are propene and butene-1 and wherein said organic radical is an amino hydrocarbyl radical of from 1 to 20 carbon atoms.

8. A copolymer according to claim 1, wherein said two olefins are ethylene and propene-1 and said organic radical is a hydrocarbyl radical of from 1 to 20 carbon atoms.

9. A copolymer according to claim 1, wherein said two olefins are ethylene and propene-1 and said organic radical is an amino hydrocarbyl radical of from 1 to 20 carbon atoms.

10. An oil of lubricating viscosity having a composition according to claim 1 in an amount sufficient to provide viscosity index improvement.

11. An oil of lubricating viscosity having a composition according to claim 2 in an amount sufficient to provide viscosity index improvement.

References Cited

UNITED STATES PATENTS

| 2,320,312 | 5/1943 | Thomas et al. | 252—48.8 |
| 2,522,512 | 9/1950 | Harman et al. | 252—45 |
| 2,817,653 | 12/1957 | Cole et al. | 252—45 |
| 3,041,283 | 6/1962 | Calhoun et al. | 260—79.5 |

DANIEL E. WYMAN, Primary Examiner.

L. G. XIARHOS, W. H. CANON, Assistant Examiners.